United States Patent [19]

McClung, Jr.

[11] 4,377,610
[45] Mar. 22, 1983

[54] NON SLIDABLE BOTTOM SURFACE FOR A FLOOR COVERING

[76] Inventor: Eugene F. McClung, Jr., 49 La Senda, South Laguna, Calif. 92677

[21] Appl. No.: 318,687

[22] Filed: Nov. 5, 1981

[51] Int. Cl.³ .............................................. B32B 33/00
[52] U.S. Cl. ........................................ 428/88; 428/90; 428/95; 428/167; 428/172
[58] Field of Search ................... 428/90, 95, 167, 172, 428/88; 15/215, 216, 217

[56] References Cited

U.S. PATENT DOCUMENTS 3,583,890 6/1971 Kolckmann ........................... 428/90

Primary Examiner—Marion McCamish
Attorney, Agent, or Firm—W. Edward Johansen

[57] ABSTRACT

The present invention is a bottom surface layer for a floor covering which includes a base and a top surface layer. The bottom surface layer includes a flat member having a first surface and a second surface. The first surface is mechanically coupled to the base of the floor covering. The bottom surface layer also includes a plurality of nylon bristles which are electrostatically flocked onto the second surface of the flat member and permanently bonded thereto whereby the plurality of nylon bristles lock into a carpet on a floor and prevent lateral sliding of the floor covering when the feet of a sitting person produce downward and lateral forces on the floor covering. The flat member may be formed out of compounded tire rubber and the top surface layer has a raised design for collecting dirt and providing drainage. The flat member may also be formed out of a fabric material which is fixedly coupled to the base of the floor covering.

3 Claims, 4 Drawing Figures

NON SLIDABLE BOTTOM SURFACE FOR A FLOOR COVERING

BACKGROUND OF THE INVENTION

1. Field of the Invention

The present invention relates to floor mats for automobiles and more particularly to floor mats which will not slide about the floor of the automobile during their use therein.

2. Description of the Prior Art

U.S. Pat. No. 3,605,166, entitled Floor Mat Construction, issued to John W. Chen on Sept. 20, 1974, teaches a floor mat construction which is especially suitable for use in the interior of automobiles. Each floor mat includes a tray, a grate and fastening devices for removably securing the grate in a desired position over the tray. The tray is formed with internal partitions which define a plurality of open-top compartments that are formed to hold mud, water and the like in a fixed area against splashing. A grating is formed to fit over the tray and to completely cover the partitions therein. The grate is formed with tapered sides and terminates in knife-like upper edges. The whole floor mat construction is preferably formed of tough, light-weight resilient material such as rubber or rubber compositions. The grating provides a larger number of smaller openings than the number of compartments which are preferably of the same shape.

U.S. Pat. No. 3,654,657, entitled Foot Mat for Vehicles, issued to Otto Hubel on Apr. 11, 1974, teaches a foot mat of elastomeric material for vehicles. The foot mat has honey-comb or alveolar cells in a slanting or inclined arrangement with respect to the base of the foot mat with the cross section of each of the cells increasing fronm the bottom upwardly towards its upper open end.

U.S. Pat. No. 2,908,027, entitled Floor Mat, issued to Eugene F. McClung on Oct. 13, 1959, teaches a floor mat which includes a flexible rubber base and a plurality of rubber fabric strips which are mounted in spaced relation on the base and joined thereto. The base is formed with a round-bottomed grooves between the strips. The strips are arranged with upwardly extending fibrous cords which are embedded therein. Each strip has an attrite upper surface with ends of fibrous cords extending vertically from the attrite surface and projecting upward and from the edges of the attrite surface to fluff over and form flocculent mat surfaces of greater width than the width of the strips.

U.S. Pat. No. 4,143,194, U.S. Pat. No. 1,680,442 and U.S. Pat. No. 4,109,439 teach floor mats.

In the prior art there have been a number of floor mats for automobiles, but all of these floor mats have a tendency to slide about the floor of the automobile under the pressure of the foot of the driver. This sliding is not only inconvenient to the driver, but may also be dangerous to him. There have been many attempts to solve this problem of the floor mat sliding about the floor of the automobile, but none of the previous solutions has been adequate. A further limitation that the floor mats must be relatively light in weight in order to conserve fuel compounds the difficulty of finding a solution to this problem.

The problem of floor mats sliding about the floor is not limited to their use in automobiles. This problem occues with throw rugs in the home. The use of a velcro-type fastening system on the bottom of the floor mat and the floor is an apparant solution. The difficulty with the use of a velcro-type fastening system is that the velcro-fastening system provides too much fastening capabilities and makes it difficult to remove the floor mats or the throw rugs from the floor in order to clean them.

U.S. Pat. No. 3,461,511, entitled Fastening Apparatus, issued to Joseph Perina on Aug. 19, 1969, teaches a first member having a plurality of hooking elements on a surface and a second member having a plurality of complementary hooking elements on an opposing surface.

Among the floor mats of the prior art is a floor mat having a base formed out of compounded tire rubber which has a raised design such as series of longitidinally disposed ribs that form grooves for collecting dirt and providing drainage and which a plurality of nylon bristle which is electrostaticly flocked onto the top surface of the base and permanently bonded to the raised design.

SUMMARY OF THE INVENTION

In view of the foregoing factors and conditions which are characteristic of the prior art it is the primary object of the present invention to provide a non-slidable floor mat for use in automobile which has a bottom surface which will prevent the floor mat from sliding about the floor of the automobile as a result of the downward and lateral forces of the foot of the driver.

It is another object of the present invention to provide a non-slidable floor mat which is not only durable, but which is also light in weight.

It is still another object of the present invention to provide a bottom surface for either a non-slidable floor mat or a throw rug which prevents it from sliding about the floor under the downward and lateral force of the foot of a sitting person, yet which the person can easily pick up from the floor in order to clean it.

In accordance with the present invention an embodiment of a bottom surface layer for a floor covering which includes a base and a top surface layer is described. The bottom surface layer includes a flat member having a first surface and a second surface. The first surface is mechanically coupled to the base of the floor covering. The bottom surface layer also includes a plurality of nylon bristles which are electrostaticly flocked onto the second surface of the flat member and permanently bonded thereto whereby the plurality of nylon bristles lock into a carpet on a floor and prevent lateral sliding of the floor covering when the feet of a sitting person produce downward and lateral forces on the floor covering. The flat member may be formed out of compound tire rubber and the top surface layer has a raised design for collecting dirt and providing drainage. The flat member may also be formed out of a fabric material which is fixedly coupled to the base of the floor covering.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
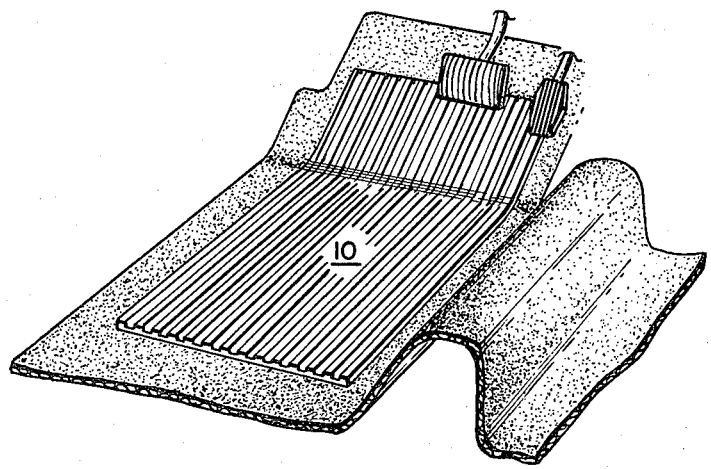
FIG. 1 is a perspective view of a first non-slidable bottom surface layer for a floor mat which has been constructed in accordance with the principles of the present invention and which is used on the floor of an automobile.

In order to best understand the present invention it is necessary to refer to the following description of its preferred embodiment in conjunction with the accompanying drawing. Referring to FIG. 1 a first floor mat 10 includes a base 11 having a top surface layer 12 and a bottom surface layer 13 which includes a plurality of nylon bristles 14 which are electrostaticly flocked onto the bottom surface layer 13 of the base 11 and permanently bonded thereto whereby the plurality of nylon bristles 14 are able to lock into a carpet on a floor of an automobile and prevent lateral sliding of the floor covering when the feet of a sitting person produce downward and lateral forces on the floor mat 10. The base may be formed out of compounded tire rubber and the top surface layer 12 has a raised design for collecting dirt and providing drainage and includes a plurality of nylon bristles 14 which are electrostaticly flocked onto the top surface layer 12 of the base 11 and permanently bonded thereto.

Figure 2:
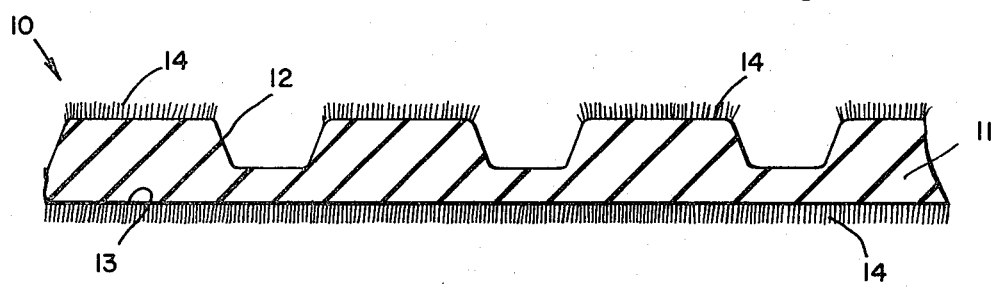
FIG. 2 is a side elevational view of the floor mat of FIG. 1.

Referring to FIG. 2 in conjunction with FIG. 1 the plurality of nylon bristles 14 are disposed so that they are able to lock into the fabric of the carpet when a downward force is applied and thereby prevent a lateral sliding which a lateral force would ordinarily cause. The particular construction of the floor mat 10, which is not only durable, but is also light in weight, is ideal for use on the floor of an automobile. The problem of the floor mat sliding on the floor of an automobile has been a long standing one. The Velcro-type fastening material requires both a female section of fastening material and a male section of fastening material and is therefore inadequate for use with a floor mat. The Velcro-type fastening material also provides the floor mat too much adhesion to the floor of the automobile. The floor mat 10 must be used in combination with a carpet on the floor of the automobile. The particular construction of the floor mat 10 is also such that it is heavy enough to allow the floor mat 10 to rest on the floor of the automobile without folding back onto itself.

Figure 3:
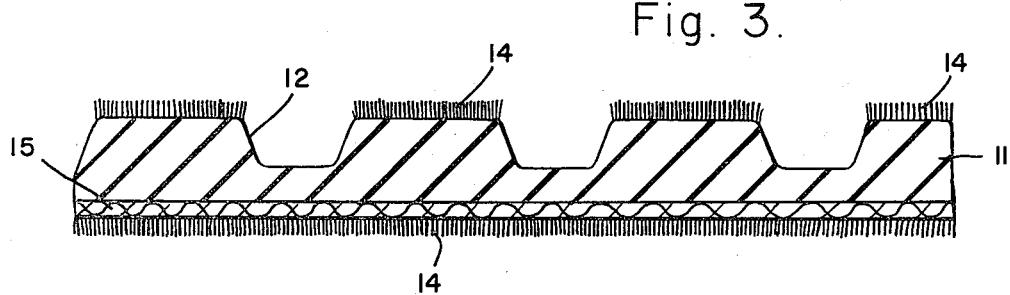
FIG. 3 is a side elevation of a floor mat which has a second non-slidable bottom surface layer, which has also been constructed in accordance with the principles of the present invention.

Referring to FIG. 3 a second embodiment of the present invention is a bottom surface layer for a floor mat 10 which includes a base 11 having a top surface layer 12 and a surface layer 13. The floor mat 10 also includes a flat member 15 having a first surface and a second surface. The first surface of the flat member 15 is mechanically coupled to the bottom surface layer 13 of the base 11 of the floor mat 10. The second surface of the flat member 15 includes a plurality of nylon bristles 14 which are electrostaticly flocked onto the second surface of the flat member 15 and permanently bonded thereto whereby the plurality of nylon bristles 14 are able to lock into a carpet on a floor of an automobile and prevent lateral sliding of the floor covering when the feet of a sitting person produce downward and lateral forces on the floor mat 10. The flat member 15 may be formed out of a fabric material which is fixedly coupled to the bottom surface layer 12 of the base 11 of the base 11 of the floor mat 10.

Figure 4:
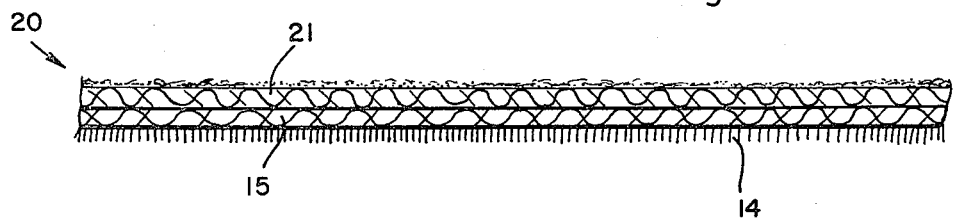
FIG. 4 is a side elevational of a throw rug which has the second non-slidable bottom surface layer of the floor mat of FIG. 3 attached to its bottom surface so that the throw rug will not slide along the carpet on which it is placed.

Referring to FIG. 4 a third embodiment of the present invention is a bottom surface layer for a throw rug 20 which includes a rug 21 having a top surface layer and a surface layer. The throw rug 20 also includes a flat member 15 having a first surface and a second surface. The first surface of the flat member 15 is mechanically coupled to the bottom surface layer of the rug 21. The second surface of the flat member 15 includes a plurality of nylon bristles 14 which are electrostaticly flocked onto the second surface of the flat member 15 and permanently bonded thereto whereby the plurality of nylon bristles 14 are able to lock into a carpet on a floor of an automobile and prevent lateral sliding of the throw rug 20 when the feet of a sitting person produce downward and lateral forces on the throw rug 20. The flat member 15 may be formed out of a fabric material which is fixedly coupled to the bottom surface layer of the rug 21.

From the foregoing it can be seen that a non-slidable bottom surface layer for a floor mat has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A bottom surface layer for a floor covering which includes a base and a top surface layer, said bottom surface layer comprising:
   a. a flat member having a first surface and a second surface, with said first surface being mechanically coupled to the base of the floor covering wherein said member is formed out of a fabric material which is fixedly coupled to the base of the floor covering;
   b. a plurality of nylon bristles which are electrostaticly flocked onto said second surface of said member; and
   c. bonding means for permanently bonding said plurality of nylon bristles to said second surface of said member, whereby said plurality of nylon bristles lock into a carpet on a floor and prevent lateral sliding of the floor covering when the feet of a sitting person produce downward and lateral forces on the floor covering.

2. A bottom surface layer for use in combination with a floor covering according to claim 1 wherein said member is formed out of compounded tire rubber and the top surface layer has a raised design for collecting dirt and providing drainage.

3. A bottom surface layer for use in combination with a floor covering according to claim 1 wherein said floor covering is a throw rug and said member is formed out of a fabric material which is fixedly coupled to the bottom surface of the throw rug in order to prevent the throw rug from sliding when the foot of a sitting person places downward and lateral forces on it.

* * * * *